Sept. 16, 1941.    H. N. CARVER    2,256,014
SIGNALING DEVICE
Filed Jan. 15, 1938
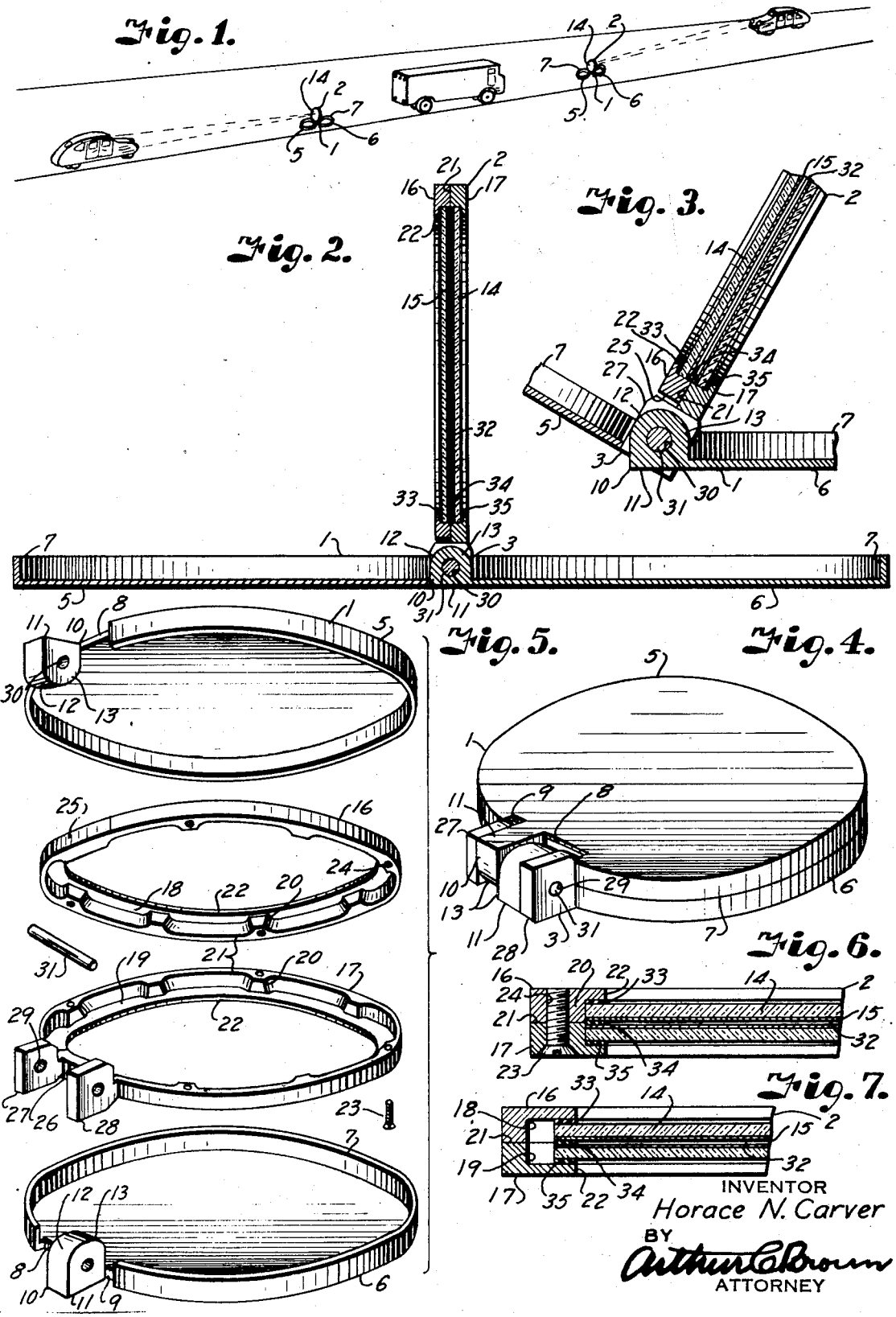
INVENTOR
Horace N. Carver
BY
Arthur C. Brown
ATTORNEY Patented Sept. 16, 1941

2,256,014

UNITED STATES PATENT OFFICE 2,256,014

SIGNALING DEVICE

Horace N. Carver, Wichita, Kans.

Application January 15, 1938, Serial No. 185,169

2 Claims. (Cl. 248—176)

This invention relates to signaling devices and more particularly to a portable signal adapted to be conveniently placed on roads for warning motorists of obstructions on the road.

It is ordinarily difficult for operators of vehicles particularly loaded trucks, to pull off the road when it is necessary to make repairs on the vehicles, for example in changing tires, and stalled or otherwise stationary vehicles on roads create a hazard not only to motorists generally but also to the vehicle operators and the property under their control.

It is the principal object of the present invention to provide a signal capable of reflecting light rays from the lights of approaching vehicles to warn the occupants of those vehicles of obstructions on roads.

Other important objects of the present invention are to provide a collapsible light reflecting signal of sturdy construction; to provide against accidentally tipping over the signal; to provide an enclosure for the reflector which also acts as a base therefor; to provide a compact and easily operable signal; to provide protection for an improved reflector forming part of the signal; to provide for effectively exposing the reflector upon opening the base enclosure; and to provide improved parts and arrangements of parts making up the signaling device.

In accomplishing these and other objects of the present invention, I have provided improved details of structure, the preferred form of which is illustrated in the accompanying drawing wherein:

Fig. 1 is a perspective view of a road with vehicles thereon illustrating an arrangement of placing thereon signaling devices embodying the features of the present invention.

Fig. 2 is a transverse section through a signaling device embodying the features of this invention when in opened operative condition.

Fig. 3 is a fragmentary vertical cross-section through the hinged parts of the signaling device particularly illustrating the manner in which the reflector is moved to vertical operative position.

Fig. 4 is a perspective view of the signaling device in collapsed condition to facilitate storage thereof.

Fig. 5 is a detail disassembled perspective view of the relative parts of the signaling device.

Fig. 6 is a fragmentary transverse section through a portion of the reflector per se particularly illustrating the mounting of the reflector plates on the frame bosses.

Fig. 7 is a substantially similar section at a point between a pair of the reflector supporting bosses in the frame.

Referring more in detail to the drawing:

The invention generally preferably includes a two-part cover member 1, Fig. 4, forming an enclosing base for a reflector 2, Fig. 2, the cover and reflector being hinged relative to each other as at 3, Fig. 3, in such a manner that the cover 1 is adapted to enclose the reflector for suitable storage, the cover member itself when opened raising the reflector to reflecting position and forming a rigid base for adequately supporting the reflector in operative condition.

In the present instance, the housing members of the signaling device embodying this invention are shown to preferably include substantially duplicate cast plates 5 and 6 of circular shape, each having a substantially continuous peripheral laterally turned flange 7 having spaced recesses 8 and 9 of different size, which recesses also extend into the body of the plates.

A boss 10 is preferably formed integrally on each of the plates between the recesses and extends outwardly relative to the peripheries of the plates. The bosses 10 are each provided with a face 11 preferably flush with the outer face of its plate and a laterally extending rounded end 12 oppositely disposed relative to the face 11 forming a substantially semi-circular lug 13 at the end of each of the bosses.

The reflector 2 preferably comprises plates 14 each preferably formed of colored glass or similar semi-transparent material having lustrous backings 15 thereon. The edges of the plates are mounted within mating frame members 16 and 17 which are preferably of substantially circular or ring shape and the frames are provided with concaved inner surfaces 18 and 19. Spaced alignable bosses 20 are provided on the concaved portions in the interior of each of the frame members which preferably initiate at the edges 21 of the frame concavities in order to be engaged by the corresponding boss on the other frame and which terminate short of the edges 22 of the concavities to form a seat for the peripheral edges of the reflector plates 14, the outer side edges of the plates being engaged by the edges 22 of the concave portions of the frames to secure the plates in the frames. The frames may be fastened together in a suitable manner as by the extension of fastening devices 23 through aligned apertures 24 in the bosses.

A portion of the periphery of each frame ring is preferably flattened as shown at 25 and 26, Fig. 5, the flattened portion 26 of the frame ring 17 being provided with outwardly extending bosses 27 and 28 having substantially squared outer corners. The bosses 27 and 28 are provided with apertures 29 adapted to be aligned with similar apertures 30 in the bosses 10 on each of the cover plate members to receive a suitable hinge pin 31 therein to hinge the cover members onto and about the reflector.

As a matter of pratice, the reflector plates 14 are preferably spaced, as shown at 32 in Fig. 3, and the outer edges of the plates are engaged by gaskets 33, 34 and 35 mounted in the ring frames for cushioning the reflector plates relative to their support to thereby permit relatively rough treatment of the signaling device without danger of breaking the reflectors. The space 32 between the reflectors further acts to separate the reflector plates in such a manner that if one of the plates is broken the other may still be used, the inner gasket 34 acting to hold either of the reflectors in its frame to maintain the signal in effective condition even if one of the reflector plates is broken.

The assembly and operation of a signaling device constructed as described is as follows:

A pair of the plates 5 and 6 are preferably employed together in facing relation, that is, with the peripheral edges of the flanges 7 in abutting relation. Since the plates are similarly designed they may be oppositely disposed relative to each other in such a manner that the bosses 10 are positioned adjacent each other in side by side relation, as shown in Fig. 4, when one of the plates is superimposed upon the other plate. The flanges 7 of the cover plates space the body portions thereof sufficiently for receiving therewithin the frame members 16 and 17, which, after being equipped with the reflector plates 14, so that the lustrous backings thereon are adjacent each other, together with the gasket rings between the inner surfaces of the frames and the inner and outer peripheral edges of the plates, are fitted together and secured to each other by extension of the fastening devices through the alignable apertured bosses in the concavities of the frames. One of the outwardly extending bosses on the frame 17, for example the boss 28, is then mounted in the smaller recess 9 of one of the cover members, the other boss 27 fitting on the outside of the opposite cover plate boss and within the larger recess 8. The hinge pin 31 is then applied to the aligned apertures in the bosses 10, 27 and 28 in such a manner that the cover plates may be hinged relative to each other and to the reflector supporting frames within the cover plates.

Since the ends 12 of each of the cover plate bosses are rounded, when one of the cover plates is moved away from the other cover plate, it may be freely lifted to a vertical position. When the movement is continued beyond an angle of approximately ninety degrees, that portion of the moved plate member which bounds the bottoms of the recesses therein engages the upper face of the frame bosses 27 and 28, and continued movement of the plate bears downwardly on those bosses to lift the reflector to substantially vertical position for placing it in effective condition to reflect light rays from either side thereof.

In open condition, the plate members are in substantially the same horizontal plane, that is, co-planar relationship and provide a base of substantial area to rigidly support the reflector in erected condition, and it is unlikely that the reflector may be accidentally hinged to non-operative condition.

It is apparent that the present device may be placed at the side, in front of or behind a vehicle on a road and that either of the reflector plates may be faced toward either direction of approaching traffic on the road to warn the occupants of vehicles of an obstruction on the road.

Closing the signaling device is a very simple matter and any intentional thrust in either direction of the hinging movement of the cover plates and reflector forces the reflector downwardly and carries with it one of the cover plates to position that cover plate in a vertical position, that cover plate ordinarily following the reflector to oppositely disposed horizontal position in such a manner that the flange thereon abuts the flange of the other cover plate and encloses the reflector.

The principal advantages of a signaling device embodying the features of the present invention are that it is strong and durable and will withstand rough treatment. The covers may be very simply flipped open or closed to place the reflector in operative or in closed condition. The device is very compact and may be conveniently stored in any type of vehicle. Light rays may be reflected from either side of the reflector. Further, even should one of the reflector plates be broken, the gaskets prevent the other plate from falling out and the reflector is still effective to reflect light rays from at least one source of light incidence.

What I claim and desire to secure by Letters Patent is:

1. A road signal including a frame adapted to carry a signal element, a pair of duplicate mating members arranged on opposite sides of the frame and normally forming an enclosure therefor, said members having adjacent cut-out portions, bosses on the members extending laterally therefrom adjacent said cut-out portions, a boss on the frame extending through said cut-out portions adjacent the bosses of said members, and means hinging said bosses together to swingingly interconnect said frame and mating members, portions of said members bounding said cut-out portions being engageable with portions of the boss on the frame to move said frame in response to movement of a mating member outwardly relative to the other mating member, the boss on said frame being reduced at its inner end to allow said mating member portions to pass by the same and having relatively flat outer portions for engagement by one of said mating member portions when the latter is in substantially perpendicular relation to the other mating member portion.

2. A road signal including a frame adapted to carry a signal element, a pair of duplicate mating members arranged on opposite sides of the frame and normally forming an enclosure therefor, said members having adjacent cut-out portions, bosses on the members extending laterally therefrom adjacent said cut-out portions, a boss on the frame extending through said cut-out portions adjacent the bosses of said members, and means hinging said bosses together to swingingly interconnect said frame and mating members, portions of said members bounding said cut-out portions being engageable with portions of the boss on the frame to move said frame in response to movement of a mating member outwardly relative to the other mating member, the boss on said frame being reduced at its inner end to allow said mating member portions to pass by the same and having relatively flat outer portions for engagement by one of said mating member portions when the latter is in substantially perpendicular relation to the other mating member portion, said mating member portions clamping said frame boss therebetween when the mating members are swung to co-planar relationship for maintaining said frame in erected condition relative to said mating members.

HORACE N. CARVER.